A. PHILIPPOTEAUX.
MACHINE FOR MAKING GLASS BOTTLES AND LIKE ARTICLES.
APPLICATION FILED NOV. 26, 1906.
944,691. Patented Dec. 28, 1909.
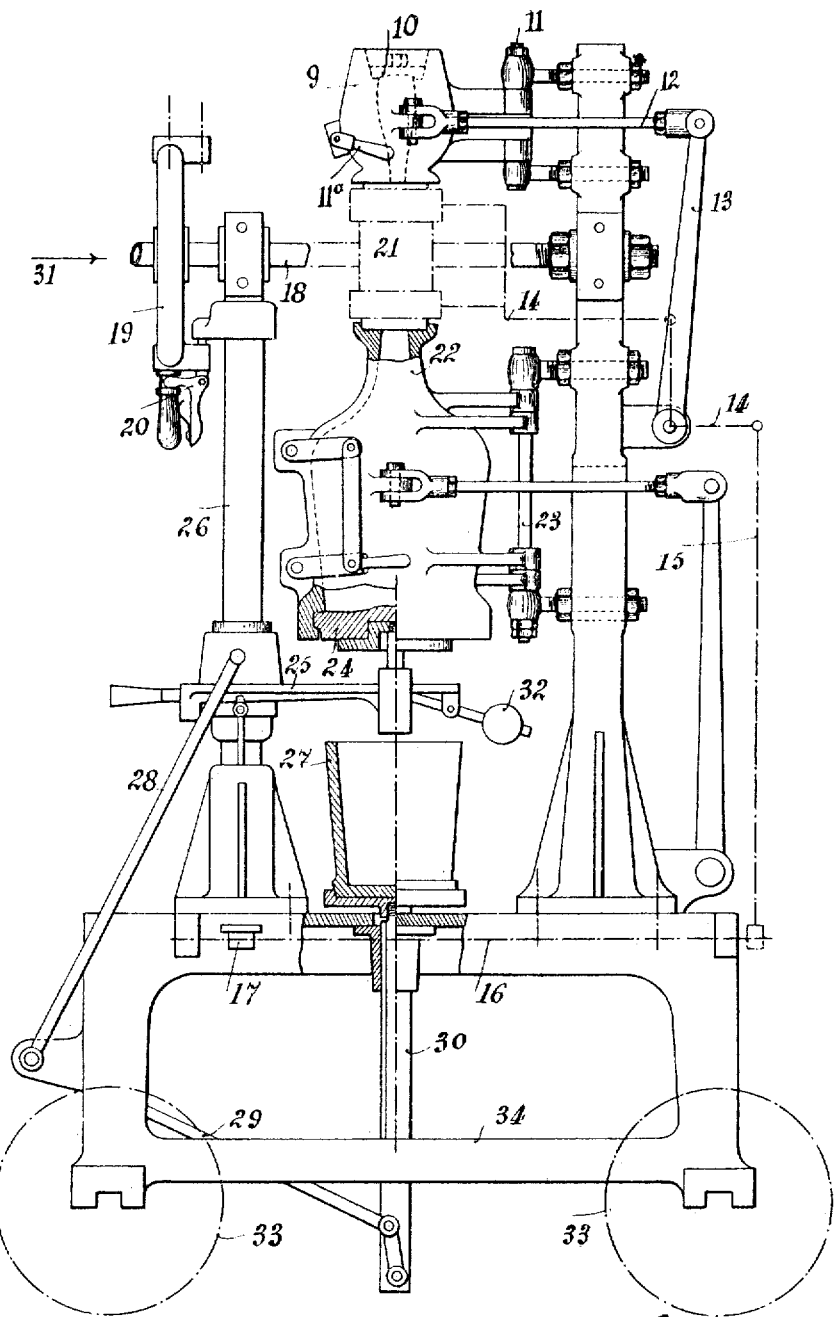

UNITED STATES PATENT OFFICE.

ALBERT PHILIPPOTEAUX, OF RHEIMS, FRANCE.

MACHINE FOR MAKING GLASS BOTTLES AND LIKE ARTICLES.

944,691.  Specification of Letters Patent.  Patented Dec. 28, 1909.

Application filed November 26, 1906. Serial No. 345,255.

*To all whom it may concern:*

Be it known that I, ALBERT PHILIPPOTEAUX, a citizen of the French Republic, residing at Rheims, France, have invented certain new and useful Improvements in Machines for Making Glass Bottles and Like Articles, of which the following is a specification.

This invention relates to improvements in machines for making glass bottles, and comprises a special arrangement, which allows of the manufacture of bottles or flasks with long and narrow necks, combined with the machines for the mechanical manufacture of bottles and flasks; and further, an arrangement which allows of the mechanical manufacture of bulky vessels, vases, goblets, condensing tubs, and the like.

Referring to the first arrangement, it should be pointed out that in the present machines, bottles and flasks are generally made with the help of a measuring or parison mold, a ring mold and a finishing mold. The glass being poured into the measuring mold, the ring and part of the neck of the bottle or flask in course of formation is made at the outset before closing the finishing mold. It follows that the profile of the measuring mold, in its lower part, must be the same as the corresponding parts of the finishing mold; it cannot in any case be larger, as this would make it impossible to close the finishing mold. Consequently, for a bottle or flask with a long and narrow neck, the lower part of the measuring mold must necessarily be long and narrow; under these circumstances, the exterior parts of the glass poured into this mold cool rapidly, the glass cannot reach the ring mold, and if by chance it does reach it, the ring turns out badly made, and in every case, it is impossible to pierce the parison. In order to obviate this inconvenience, it is sufficient to lengthen the neck of the flask as hereafter explained.

The drawing represents an elevation partly sectional of the special machine for the manufacture of condensing tubs, goblets or like bulky vessels.

Referring to the drawing, which illustrates a practical embodiment of the construction shown in Figs. 1, 2 and 3 showing the arrangement for making bulky articles, such as goblets, condensing tubs and the like, this consists of a measuring mold and a ring mold in the upper part of the machine, and an intermediate mold in the lower part in which the article receives its preliminary shape, and lastly a jointed finishing mold in the middle part of the machine where the article is finished. According to this mode of execution, the characteristic feature of the invention is the addition of the intermediate mold which only partially incloses the parison, although the said mold might also be differently shaped and arranged so as to allow it to completely inclose the parison. The measuring mold 9 is provided with a closure 10 in its upper part, and it is mounted by pivots around an axis 11, so as to be opened in two parts by means of a handle 11ˣ, and double connecting rods and levers 12, 13. Below the measuring mold is mounted, on a shaft 18 capable of being turned 180° by means of a fly wheel 19 with double stop-action 20, the double ring mold 21, and below this latter is placed, following the same vertical axis as the other molds 10 and 21, the finishing mold 22 made in two parts capable of opening themselves by rotation around a suitable axis 23. In this mold is fitted a base 24, carried by an arm 25 movable around the column 26, so that the said base can be brought into a symmetrical position such as indicated in the drawing in relation to the axis of the column 26. In the lower part of the machine is placed the intermediate mold 27 which can be raised or lowered by hand as required, by means of levers 28, 29, controlling the bar 30 on which is fixed the said mold 27.

The operation of the machine is as follows: The glass is poured into the measuring mold 9 and the closure 10 is then fitted to it; air is then blown in the direction of the arrow 31 into the interior of the shaft 18, by means already known, so as to form the ring and pierce the parison. When the parison is formed, the measuring mold 9 is opened, the said parison turned with the ring mold and the shaft 18 by means of the fly wheel 19 by causing them to make exactly half a revolution, and (supposing the mold 22 open and the base 24 turned outside the machine) the intermediate mold 27 is raised by means of the levers 28, 29 and 30, so that it sustains and envelops the parison while the blowing is continued. The mold 27 is then allowed to descend as far as required, by working by hand the lever 28 to a convenient stop until, in order to give the article the preliminary shape in the said mold, it reaches the exact height that is required. To this end, the height of the intermediate mold must be that of the shoulder of the finished article or condensing tub, and the diameter less than that of the finished article. The article in its preliminary form being then suspended at the ring mold, the intermediate mold descends to its normal position, the base 24 is brought back to the axis of the machine as indicated in the drawing, and the finishing mold 22 is closed, after which blowing the article or condensing tub into the said mold is completed. The latter is then opened and at the same time the ring mold by means of the pedal 17, the shaft 16 and the required levers 14, 15 shown diagrammatically in the drawing. The weight of the article or condensing tub on the base 24, raised by a counterweight 32, causes this base to descend, allowing the ring to be lifted out. The article or condensing tub is removed after having brought back the base 24 outside the machine, and another operation can be then proceeded with. The machine can be mounted on wheels 33 in order to allow of its removal.

Having now particularly described and ascertained the nature of my said invention and in what manner the same is to be performed, I declare that what I claim is:

1. In a machine for making glass articles, a measuring mold in sections, a ring mold below said measuring mold, a finishing mold below the ring mold and formed in sections, a base fitted within the finishing mold, a pivotally mounted arm carrying said base, and an intermediate mold mounted for vertical movement the working positions of the intermediate and finishing molds being in vertical alinement, whereby the intermediate mold can be moved up to and away from the blank and the finishing mold moved into line with it without changing the position of the blank.

2. In a machine for making glass articles, a measuring mold in sections, a ring mold below said measuring mold, a finishing mold below the ring mold and formed in sections, a base fitted within the finishing mold, a pivotally mounted arm carrying said base, and an intermediate mold mounted for vertical movement, the working positions of the intermediate and finishing molds being in vertical alinement, whereby the intermediate mold can be moved up to and away from the blank and the finishing mold moved into line with it without changing the position of the blank, a bar on which the intermediate mold is carried, and levers connected with said bar for raising said mold to sustain and envelop the parison.

In testimony whereof I affix my signature.

ALBERT PHILIPPOTEAUX.

In the presence of—
MAURICE DINNER,
HANSON C. COXE.